(12) United States Patent
Takeuchi et al.

(10) Patent No.: US 8,795,531 B2
(45) Date of Patent: Aug. 5, 2014

(54) CO-PRODUCING APPARATUS FOR SALT AND FRESH WATER AND CO-PRODUCING METHOD OF THE SAME

(75) Inventors: Kazuhisa Takeuchi, Nagasaki (JP); Yoshiaki Ito, Nagasaki (JP); Hidemasa Kakigami, Nagasaki (JP); Hideo Iwahashi, Nagasaki (JP); Katsunori Matsui, Nagasaki (JP); Kenji Tanaka, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 406 days.

(21) Appl. No.: 13/202,927

(22) PCT Filed: Aug. 7, 2009

(86) PCT No.: PCT/JP2009/064061
§ 371 (c)(1),
(2), (4) Date: Aug. 31, 2011

(87) PCT Pub. No.: WO2010/137185
PCT Pub. Date: Dec. 2, 2010

(65) Prior Publication Data
US 2011/0303606 A1   Dec. 15, 2011

(30) Foreign Application Priority Data
May 28, 2009   (JP) ................ 2009-129468

(51) Int. Cl.
*B01D 61/58*   (2006.01)
*B01D 61/02*   (2006.01)
*C02F 1/44*   (2006.01)
*C02F 9/00*   (2006.01)
*B01D 61/44*   (2006.01)
*B01D 61/42*   (2006.01)
*C02F 1/66*   (2006.01)
*C02F 1/04*   (2006.01)
*C02F 103/08*   (2006.01)
*C02F 1/469*   (2006.01)

(52) U.S. Cl.
CPC . *C02F 9/00* (2013.01); *B01D 61/44* (2013.01); *B01D 61/422* (2013.01); *B01D 2311/18* (2013.01); *C02F 1/66* (2013.01); *C02F 1/04* (2013.01); *C02F 2209/005* (2013.01); *C02F 2103/08* (2013.01); *B01D 2311/2673* (2013.01); *B01D 61/025* (2013.01); *C02F 1/4693* (2013.01); *B01D 61/027* (2013.01); *B01D 61/58* (2013.01); *C02F 1/441* (2013.01)
USPC ....... 210/639; 210/96.2; 210/195.2; 210/203; 210/259; 210/321.6; 210/652; 210/770; 210/774; 210/805; 210/806; 204/519; 204/627; 204/633; 159/47.1; 423/499.4

(58) Field of Classification Search
CPC .... B01D 61/025; B01D 61/027; B01D 61/44; B01D 61/422; B01D 61/58; B01D 2311/2649; B01D 2311/26; B01D 2311/2673; B01D 2311/2684; B01D 12/00; B01D 17/00; C02F 1/04; C02F 1/441; C02F 1/4693; C02F 1/4604; C02F 2103/08; C02F 2209/005; C02F 1/44; C22B 26/00
USPC .............. 210/85, 96.2, 110, 195.2, 202, 203, 210/259, 321.6, 321.69, 636, 639, 641, 652, 210/739, 774, 805, 806, 182, 770; 204/518–520, 522, 627, 628, 633, 637; 423/499.4, 499.5; 159/47.1; 202/152, 202/180; 203/10, 39
See application file for complete search history.

(56) References Cited

U.S. PATENT DOCUMENTS

| | | | | |
|---|---|---|---|---|
| 4,083,781 A * | 4/1978 | Conger | ......... | 210/651 |
| 4,539,091 A * | 9/1985 | Kaneda et al. | ......... | 204/628 |
| 4,574,049 A * | 3/1986 | Pittner | ......... | 210/639 |
| 5,460,723 A * | 10/1995 | Bourbigot et al. | ......... | 210/639 |
| 5,814,224 A * | 9/1998 | Khamizov et al. | ......... | 210/638 |
| 6,030,535 A | 2/2000 | Hayashi et al. | | |
| 6,998,053 B2 * | 2/2006 | Awerbuch | ......... | 210/652 |
| 7,077,962 B2 * | 7/2006 | Pipes | ......... | 210/652 |
| 7,083,730 B2 * | 8/2006 | Davis | ......... | 210/652 |

| | | | |
|---|---|---|---|
| 8,137,539 B2 * | 3/2012 | Gilron et al. | 210/96.2 |
| 2004/0245175 A1 * | 12/2004 | Godec et al. | 210/639 |
| 2005/0103717 A1 * | 5/2005 | Jha et al. | 210/652 |

FOREIGN PATENT DOCUMENTS

| JP | 8-089958 A | 4/1996 |
|---|---|---|
| JP | 8-318136 A | 12/1996 |
| JP | 9-276864 A | 10/1997 |
| JP | 9-290260 A | 11/1997 |
| JP | 2001-087762 A | 4/2001 |
| JP | 2002-292371 A | 10/2002 |
| JP | 2004-033848 A | 2/2004 |
| JP | 2004-290894 A | 10/2004 |
| JP | 2005-279384 A | 10/2005 |

OTHER PUBLICATIONS

International Search Report of PCT/JP2009/064061, mailing date Sep. 8, 2009.

Written Opinion of PCT/JP2009/064061, mailing date Sep. 8, 2009.

* cited by examiner

*Primary Examiner* — Joseph Drodge

(74) *Attorney, Agent, or Firm* — Westerman, Hattori, Daniels & Adrian, LLP

(57) ABSTRACT

An embodiment of the present invention includes: a recycle line that brings a part of salt-enriched membrane separation concentrated water 26 back to the rear flow side of a pretreatment apparatus 12; a water discharge line that discharges the remained concentrated water into a sea area; and a control apparatus 31 that controls to adjust the ratio between the discharging amount of the discharging membrane separation concentrated water to be discharged into a sea area and the supplying amount of supplying seawater. A pH is set to be equal to or less than 7.3 by adding acid 21. The salt 18 is obtained from the dryer 19, and produced water (fresh water) 29 is obtained by combining evaporated water 28 supplied from the evaporator 16 with the permeated water 24 supplied from the reverse osmosis membrane apparatus 25.

5 Claims, 4 Drawing Sheets

CO-PRODUCING APPARATUS FOR SALT AND FRESH WATER AND CO-PRODUCING METHOD OF THE SAME

TECHNICAL FIELD

The present invention relates to a co-producing apparatus for salt and fresh water that is capable of producing salt and fresh water with a single equipment, and a co-producing method of the same.

BACKGROUND ART

Disclosed is a method of obtaining permeated water (produced water) by first supplying seawater to a reverse osmosis apparatus and then desalting the seawater, while obtaining salt by supplying concentrated water to an electrodialyzer and further concentrating the concentrated water in an evaporator (salt production) (Patent Document 1 and Patent Document 2).

Disclosed is a method of obtaining salt by first supplying seawater to an electrodialyzer and then concentrating concentrated brine in an evaporator, while obtaining permeated water by supplying diluted brine to a reverse osmosis apparatus (Patent Document 3 and Patent Document 4).

Patent Document 1: Japanese Patent Application Laid-open No. 9-276864
Patent Document 2: Japanese Patent Application Laid-open No. 2004-33848
Patent Document 3: Japanese Patent Application Laid-open No. 8-318136
Patent Document 4: Japanese Patent Application Laid-open No. 8-89958

DISCLOSURE OF INVENTION

Problem to be Solved by the Invention

In a conventional reverse osmosis method, concentrated seawater is produced while permeated water (produced water) is obtained. However, discharging the concentrated seawater as is to the environment gives adverse effects on an ecosystem because of its high salt content. For this reason, the treatment of the concentrated seawater has become a problem in recent years.

Especially, Patent Document 2 discloses a method of resupplying diluted brine discharged from an electrodialyzer to a reverse osmosis apparatus, which solves the discharging problem of the concentrated seawater. However, the method has no other choice but to recover almost the entire salt content of seawater, which leads to a problem that the ratio between the producing amount of water and the producing amount of salt cannot be controlled. Therefore, when a gap exists between the amount supplied and the amount demanded for salt and water, it is difficult to respond to the situation.

Patent Documents 3 and 4 disclose that permeated water is obtained by supplying diluted brine discharged from an electrodialyzer to a reverse osmosis apparatus. Although concentrated seawater is produced together with the permeated water, the concentration of the concentrated seawater can be equal to or less than the concentration of raw seawater supplied to the electrodialyzer by adjusting the recovery rate of the permeated water.

In this point, a problem of discharging seawater with a high salt content into the environment is solved. However, the following new problems occur.

1) An ion-exchange membrane used in an electrodialyzer has, as its general characteristic, a property by which divalent ions are hard to pass through the membrane as compared with monovalent ions in seawater. As a result, while $Na^+$ and $Cl^-$ as monovalent ions, which are main components of seawater, are concentrated, $Ca^{2+}$, Me, $CO_3^{2-}$, $SO_4^{2-}$, and the like among sub-components, all of which are dissolved as divalent ions, are hard to be concentrated as compared with monovalent ions. Consequently, the composition ratio of the above ion species in diluted brine becomes higher than that of seawater.

2) The diluted brine is supplied to a rear stage reverse osmosis (RO) membrane to provide permeated water. At this time, the divalent ions are concentrated at a concentrated side. These divalent ions are prone to be deposited as scale components with low solubility. The scale components adhere to the surface of the RO membrane to reduce the amount of water to be permeated, which causes a problem of so-called generation of scale adhesion.

The present invention has been made in view of the problems, and an object thereof is to provide a co-producing apparatus for salt and fresh water that co-produces salt and water stably by suppressing a scale trouble in a reverse osmosis process, as well as discharging no concentrated water with a higher concentration than that of seawater so as not to give adverse effects to the environment, and a co-producing method of the same.

Means for Solving Problem

According to an aspect of the present invention, a co-producing apparatus for salt and fresh water includes: a pretreatment apparatus that filters a turbid content of raw water; an electrodialyzer that electrodialyzes pretreated water supplied from the pretreatment apparatus; an evaporator that evaporates concentrated brine dialyzed by the electrodialyzer; a dryer that produces salt by drying condensed water supplied from the evaporator; an acid adding unit that adds acid to diluted brine supplied from the electrodialyzer; a reverse osmosis membrane apparatus having a reverse osmosis membrane that produces fresh water that is permeated water obtained by removing a salt content from the diluted brine to which the acid is added; a recycle line that brings a part of salt-enriched membrane separation concentrated water supplied from the reverse osmosis membrane apparatus back to a rear flow side of the pretreatment apparatus; a water discharge line that discharges branched remained concentrated water into a sea area; and a control apparatus that controls to adjust a ratio between a discharging amount of discharging membrane separation concentrated water to be discharged into a sea area and a supplying amount of the raw water by detecting ion concentrations of divalent ions and $SO_4^{2-}$ ions in recycling membrane separation concentrated water to be recycled so that these ion concentrations are equal to or less than a saturation concentration of gypsum. A pH of acid-added diluted brine is set to be equal to or less than 7.3 by adding the acid from the acid adding unit to prevent scale generation, and the salt is obtained from the dryer, and produced water is obtained by combining evaporated water supplied from the evaporator with the permeated water supplied from the reverse osmosis membrane apparatus.

According to another aspect of the present invention, a co-producing apparatus for salt and fresh water includes: a pretreatment apparatus that filters a turbid content of raw water; an electrodialyzer that electrodialyzes pretreated water supplied from the pretreatment apparatus; an evaporator that evaporates concentrated brine dialyzed by the electrodialyzer; a dryer that produces salt by drying condensed water supplied from the evaporator; an acid adding unit that adds acid to diluted brine supplied from the electrodialyzer; a nanofiltration membrane separation apparatus that removes divalent ions from the diluted brine to which the acid is added, and a reverse osmosis membrane apparatus having a reverse osmosis membrane that produces fresh water that is permeated water obtained by removing a salt content of treated water supplied from the nanofiltration membrane separation apparatus; a recycle line that brings a total amount of salt-enriched membrane separation concentrated water supplied from the reverse osmosis membrane apparatus back to a rear flow side of the pretreatment apparatus; a water discharge line that discharges a total amount of membrane separation concentrated water supplied from the nanofiltration membrane separation apparatus into a sea area; and a control apparatus that controls to adjust a ratio between a discharging amount of discharging membrane separation concentrated water to be discharged into a sea area and a supplying amount of the raw water by detecting ion concentrations of divalent ions and $SO_4^{2-}$ ions in recycling membrane separation concentrated water to be recycled so that these ion concentrations are equal to or less than a saturation concentration of gypsum. A pH of acid-added diluted brine is set to be equal to or less than 7.3 by adding the acid from the acid adding unit to prevent scale generation, and the salt is obtained from the dryer, and produced water is obtained by combining evaporated water supplied from the evaporator with the permeated water supplied from the reverse osmosis membrane apparatus.

Advantageously, the co-producing apparatus for salt and fresh water further includes a bypass line through which, after the acid is added to the diluted brine supplied from the electrodialyzer, a part of the acid-added diluted brine bypasses the nanofiltration membrane separation apparatus, to be supplied to the reverse osmosis membrane apparatus.

Advantageously, in the co-producing apparatus for salt and fresh water, the ion concentrations are determined by an ion concentration meter.

According to still another aspect of the present invention, a co-producing method for salt and fresh water includes: filtering a turbid content of raw water by a pretreatment apparatus, electrodialyzing resultant pretreated water, and evaporating resultant concentrated brine to produce salt; and adding acid to diluted brine obtained after the electrodialyzing, and removing a salt content from acid-added diluted brine by a reverse osmosis membrane apparatus to obtain fresh water that is permeated water. A part of salt-enriched membrane separation concentrated water supplied from the reverse osmosis membrane apparatus is brought back to a rear flow side of the pretreatment apparatus, a pH of the acid-added diluted brine is set to be equal to or less than 7.3 to prevent scale generation when the branched remained concentrated water is discharged into a sea area, and a ratio between a discharging amount of discharging membrane separation concentrated water to be discharged into a sea area and a supplying amount of the raw water is adjusted by detecting ion concentrations of divalent ions and $SO_4^{2-}$ ions in recycling membrane separation concentrated water to be recycled so that these ion concentrations are equal to or less than a saturation concentration of gypsum, when the branched remained concentrated water is discharged into a sea area.

According to still another aspect of the present invention, a co-producing method for salt and fresh water includes: filtering a turbid content of raw water by a pretreatment apparatus, electrodialyzing resultant pretreated water, and evaporating resultant concentrated brine to produce salt; and adding acid to diluted brine obtained after the electrodialyzing, and removing a salt content from acid-added diluted brine by a reverse osmosis membrane apparatus to obtain fresh water that is permeated water. A pH of the acid-added diluted brine is set to be equal to or less than 7.3 to prevent scale generation, divalent ions in the diluted brine are removed by using a nanofiltration membrane separation apparatus at a front stage of the reverse osmosis membrane apparatus, a total amount of salt-enriched membrane separation concentrated water supplied from the reverse osmosis membrane apparatus is brought back to a rear flow side of the pretreatment apparatus, and a total amount of membrane separation concentrated water supplied from the nanofiltration membrane separation apparatus is discharged into a sea area, and a ratio between a discharging amount of discharging membrane separation concentrated water to be discharged into a sea area and a supplying amount of the raw water is adjusted by detecting ion concentrations of divalent ions and $SO_4^{2-}$ ions in recycling membrane separation concentrated water to be recycled so that these ion concentrations are equal to or less than a saturation concentration of gypsum.

Effect of the Invention

According to the present invention, the control apparatus controls to adjust the ratio between the discharging amount of discharging membrane separation concentrated water to be discharged into a sea area and the supplying amount of raw water, so that the ion concentration in recycling membrane separation concentrated water determined by an ion concentration meter is equal to or less than the saturation concentration of gypsum. Thus, membrane separation concentrated water is partly discharged into a sea area, and the remained part is recycled to the rear stage of the pretreatment apparatus. Therefore, salt and water can be co-produced stably by suppressing a scale trouble of an RO membrane in the reverse osmosis membrane apparatus as well as discharging no concentrated water with a higher concentration than that of seawater so as not to give adverse effects on the environment.

BEST MODE(S) FOR CARRYING OUT THE INVENTION

The present invention will be described in detail with reference to the accompanying drawings. The present invention is not limited to the embodiments. Constituting elements of the embodiments include elements readily convertible by a person skilled in the art, or elements being substantially the same as those.

First Embodiment

Figure 1:
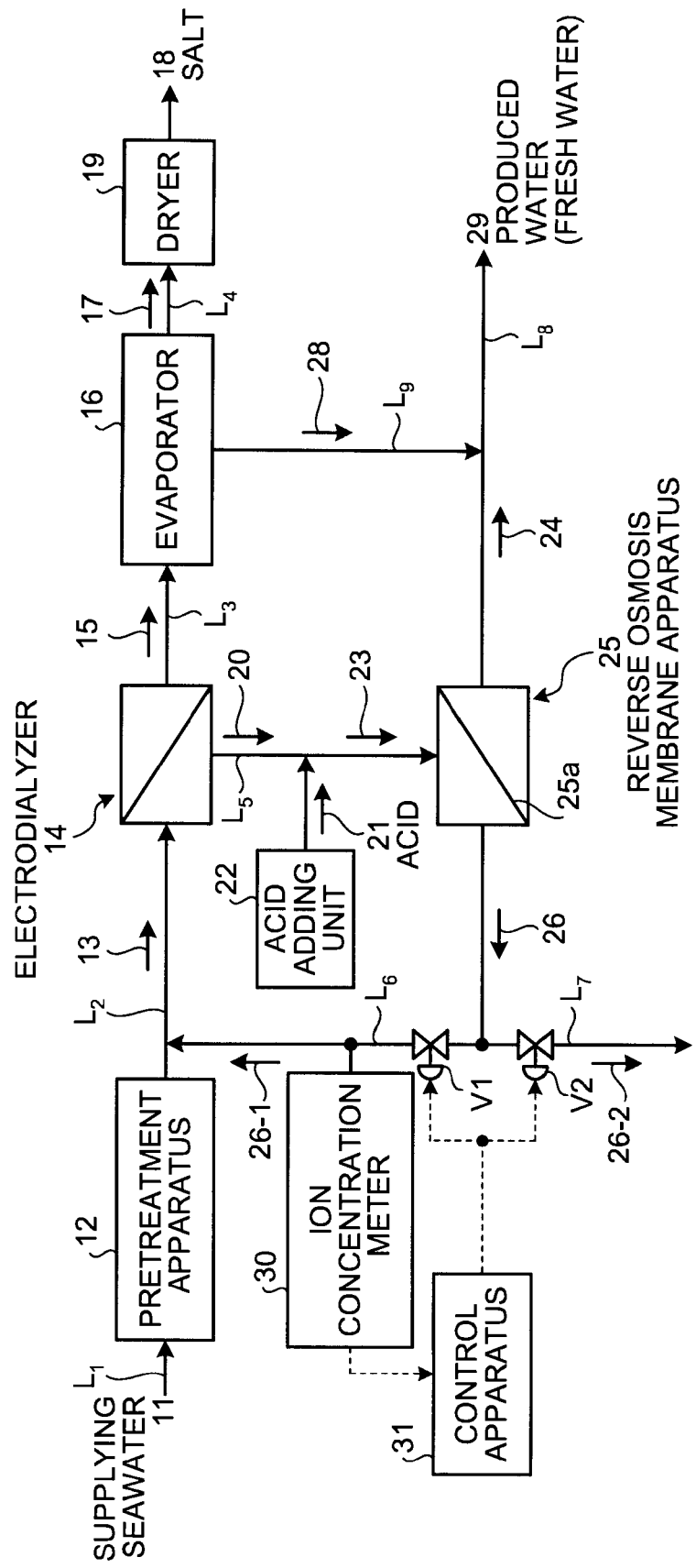
FIG. 1 is a schematic of a co-producing apparatus for salt and fresh water according to a first embodiment.

A co-producing apparatus for salt and fresh water according to a first embodiment of the present invention will be explained with reference to the accompanying drawings. FIG. 1 is a schematic of the co-producing apparatus for salt and fresh water according to the present embodiment.

As shown in FIG. 1, a co-producing apparatus for salt and fresh water 10A includes: a pretreatment apparatus 12 that filters a turbid content of supplying seawater 11 that is raw water supplied through a line $L_1$; an electrodialyzer 14 that electrodialyzes pretreated water 13 supplied from the pretreatment apparatus 12 through a line $L_2$; an evaporator 16 that evaporates concentrated brine (concentrated salt water) 15 that is dialyzed by the electrodialyzer 14 and is supplied through a line $L_3$; a dryer 19 that produces salt 18 by drying condensed water 17 supplied from the evaporator 16 through a line $L_4$; an acid adding unit 22 that adds acid (for example, a sulfuric acid or a hydrochloric acid) 21 to diluted brine (that contains large amounts of a calcium (Ca) salt and a magnesium (Mg) salt, and has a small amount of a sodium (Na) salt) 20 supplied from the electrodialyzer 14 through a line $L_5$; a reverse osmosis membrane apparatus 25 having a reverse osmosis membrane (RO membrane) 25a that produces fresh water that is permeated water 24 obtained by removing a salt content from acid-added diluted brine 23 to which the acid 21 is added; a recycle line $L_6$ that brings a part 26-1 of salt-enriched membrane separation concentrated water 26 supplied from the reverse osmosis membrane apparatus 25 back to the line $L_2$ positioned at the rear flow side of the pretreatment apparatus 12; a water discharge line $L_7$ that discharges branched remained concentrated water 26-2 into a sea area; and a control apparatus 31 that controls to adjust the ratio between the discharging amount of the discharging membrane separation concentrated water 26-2 to be discharged into a sea area and the supplying amount of the supplying seawater 11 by detecting the ion concentrations of divalent ions ($Ca^{2+}$, $Mg^{2+}$) and $SO_4^{2-}$ ions in the recycling membrane separation concentrated water 26-1 to be recycled by using an ion concentration meter 30 so that these ion concentrations are equal to or less than the saturation concentration of gypsum. In the co-producing apparatus for salt and fresh water 10A, the pH of the acid-added diluted brine 23 is set to be equal to or less than 7.3 by adding the acid 21 from the acid adding unit 22 to prevent scale generation in the reverse osmosis membrane apparatus 25. The salt 18 is obtained from the dryer 19, and produced water (fresh water) 29 is obtained by supplying evaporated water 28 supplied from the evaporator 16 through a line $l_9$ to the line $L_9$ to combine the evaporated water 28 with the permeated water 24 supplied from the reverse osmosis membrane apparatus 25.

In the co-producing apparatus for salt and fresh water according to the present invention, the control apparatus 31 controls to adjust the ratio between the discharging amount of the discharging membrane separation concentrated water 26-2 to be discharged into a sea area and the supplying amount of the supplying seawater 11. The adjustment is performed so that the ion concentrations in the recycling membrane separation concentrated water 26-1, which is detected by the ion concentration meter 30, are equal to or less than the saturation concentration of gypsum. Thus, the part 26-2 of the membrane separation concentrated water 26 is discharged into a sea area, and the remained part 26-1 is recycled to the rear stage of the pretreatment apparatus 12. Because of this, salt and water can be co-produced stably by suppressing a scale trouble of the RO membrane 25a in the reverse osmosis membrane apparatus 25 as well as discharging no concentrated water with a higher concentration than that of seawater so as not to give adverse effects on the environment.

The ratio of (the discharging amount into a sea area) of the discharging membrane separation concentrated water (discharged into a sea area) 26-2/(membrane separation concentrated water (recycled)) is adjusted so as to be in the range from equal to or more than 0.32 to less than 1 to solve the scale trouble.

Figure 4:
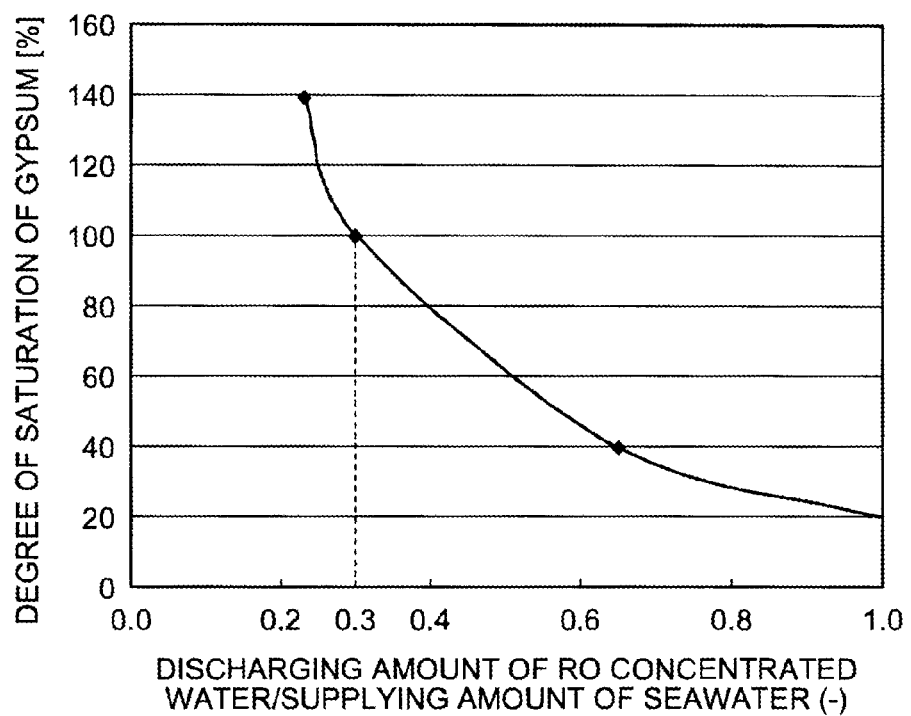
FIG. 4 is a graph for explaining a relation between the discharging amount of membrane separation concentrated water/the supplying amount of seawater and the degree of saturation of gypsum.

This is because, as shown in FIG. 4, when the ratio is equal to or less than 0.32, the degree of saturation of gypsum exceeds 100%, which is not preferable.

The acid adding unit 22 adjusts the supply of acid to the diluted brine 20 to be supplied to the reverse osmosis membrane apparatus 25, so that the pH of the diluted brine 20 is equal to or less than 7.3.

Figure 5:
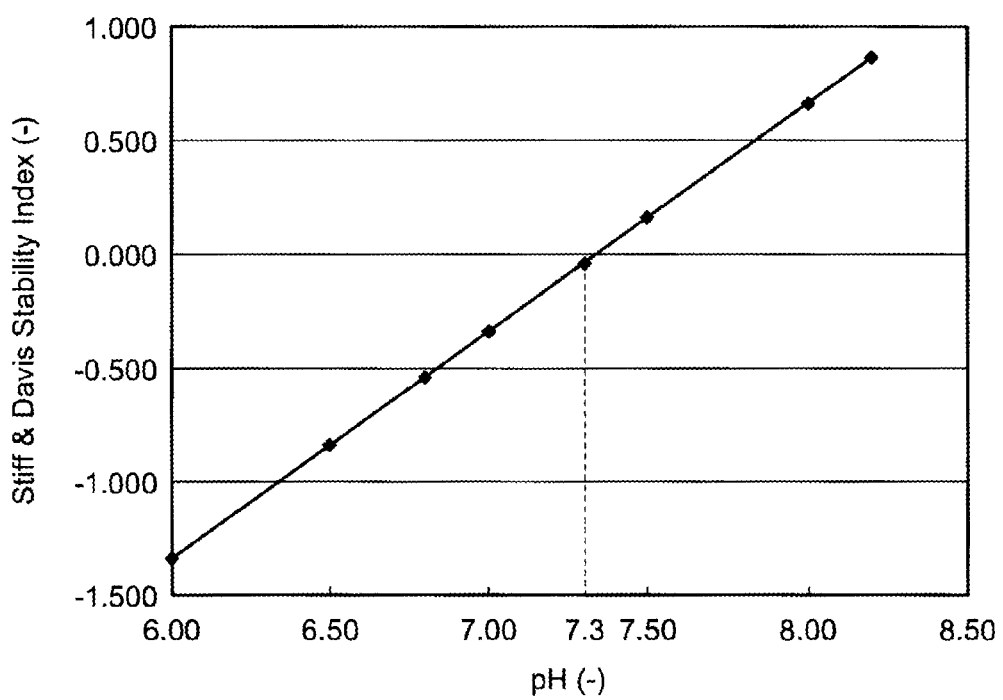
FIG. 5 is a graph for explaining a relation between the pH of diluted brine and Stiff and. Davis Stability Index.

This is because, as shown in FIG. 5 that explains a relation between the pH of the diluted brine 20 and Stiff and. Davis Stability Index, when the pH exceeds 7.3, Stiff and. Davis Stability Index exceeds 0, which is not preferable.

According to the present invention, water with a high salt concentration is not supplied, because membrane separation concentrated water has a concentration substantially equal to or less than a supplying seawater salt concentration. For this reason, adverse effects to the biological environment due to a water mass with a high salt concentration and a high density at the sea bottom accumulated on the sea bottom near a shore can be prevented.

Furthermore, a supplying pressure in the reverse osmosis membrane apparatus 25 can be lowered by way of supplying the diluted brine 20 from the electrodialyzer 14 to the reverse osmosis membrane apparatus 25. This allows to save energy through energy efficiency and downsize the apparatus.

The supplying amount of seawater, which is raw water, can be reduced by way of recycling the part 26-1 of the membrane separation concentrated water 26 to the line $L_2$ located between the pretreatment apparatus 12 and the electrodialyzer 14. This allows to downsize the pretreatment apparatus 12.

Therefore, the pretreatment apparatus can be downsized to at most 50% compared with the case when the membrane separation concentrated water is not recycled.

The part 26-1 of the membrane separation concentrated water 26 supplied from the reverse osmosis membrane apparatus 25 is recycled, and the remains 26-2 is discharged into a sea area. Therefore, the concentrations of $Ca^{2+}$ and $SO_4^{2-}$ in the diluted brine 20 supplied from the electrodialyzer 14 and the membrane separation concentrated water 26 can be equal to or less than their saturation concentrations. As a result of this, $CaSO_4$ is prevented from depositing and adhering to the ion-exchange membrane of the electrodialyzer 14 and the RO membrane 25a of the reverse osmosis membrane apparatus 25, which enables safe operation.

According to the present embodiment, the ion concentration meter 30 is provided so as to determine the ion concentrations, although the present invention is not limited thereto. For example, a conductivity meter may measure electric conductivities in the supplying seawater 11, which is raw water, to determine the concentrations of divalent ions ($Ca^{2+}$, $MG^{2+}$), and the concentration of $SO_4^{2-}$ may be determined from the additive amount of acid to be added.

Furthermore, the scale generation of $CaSO_4$, which may occur, on the RO membrane 25a of the reverse osmosis membrane apparatus 25 can also be prevented by lowering the pH.

As for the acid 21 to be added by the acid adding unit 22, a sulfuric acid is preferred for practical use, and a hydrochloric acid is preferred in terms of scale removal.

In contrast, the method of the prior application that recycles all amounts of RO concentrated water by making its discharging amount into a sea area zero leads to disadvantage due to the scale generation. Therefore, the method cannot be put into practical use.

The membrane permeation properties of the concentrations of $Ca^{2+}$ and $SO_4^{2-}$ ions vary depending on the operating conditions of the electrodialyzer 14 and the reverse osmosis membrane apparatus 25, and the properties and aging of an ion-exchange membrane and a reverse osmosis membrane.

Therefore, the concentrations of $Ca^{2+}$ and $SO_4^{2-}$ ions in the RO concentrated water where the concentrations become the highest are detected during the operation. The control apparatus 31 fine-adjusts valves $V_1$ and $V_2$ so that the concentrations become equal to or less than the saturation concentration of gypsum. The adjustment is performed so that the concentrations lower as much as possible in a range in which the ratio of "the discharging amount into a sea area of the discharging membrane separation concentrated water (discharged into a sea area) 26-2"/"the supplying amount of the supplying seawater 11" is equal to or more than 0.32 and less than 1.

As a result of this, gypsum is prevented from depositing and adhering to the membranes, and the supplying amount of seawater can be minimized while maintaining safe operation. Therefore, the load of pretreatment is reduced, which allows the pretreatment apparatus to perform energy-saving operation.

For the detection of the concentrations of $Ca^{2+}$ and $SO_4^{2-}$ ions by the ion concentration meter 30, conventional methods such as a chelate method or a gravimetric method are applicable. The saturation concentration of gypsum is computationally or experimentally derived in advance.

For apparatuses that detect electric conductivities of the membrane separation concentrated water and a sea area into which the membrane separation concentrated water is discharged, a conventional densitometer for liquid or electric conductivity meter is applicable.

The recovery rate of the permeated water may be adjusted by varying the pressure of the acid-added diluted brine 23 supplied to the reverse osmosis membrane apparatus 25.

The co-producing method of salt and fresh water of the present invention includes: filtering a turbid content of the supplying seawater 11 that is raw water by the pretreatment apparatus 12; electrodialyzing the pretreated water 13 by the electrodialyzer 14; producing the salt 18 by evaporating the resultant concentrated brine 15 as well as adding the acid 21 to the diluted brine 20 obtained after the electrodialyzing; and obtaining the produced water (fresh water) 29 that is the permeated water 24 obtained by removing a salt content from the acid-added diluted brine 23 by the reverse osmosis membrane apparatus 25. In the co-producing method, the part 26-1 of the salt-enriched membrane separation concentrated water 26 supplied from the reverse osmosis membrane apparatus 25 is brought back to the rear flow side of the pretreatment apparatus 12. When the branched remained concentrated water 26-2 is discharged into a sea area, the pH of the acid-added diluted brine 23 is set to be equal to or less than 7.3 to prevent scale generation, and the ratio between the discharging amount of the discharging membrane separation concentrated water 26-2 to be discharged into a sea area and the supplying amount of the raw water is adjusted. The adjustment is performed by detecting the ion concentrations of divalent ions and $SO_4^{2-}$ ions in the recycling membrane separation concentrated water 26-1 to be recycled so that these ion concentrations are equal to or less than the saturation concentration of gypsum. Therefore, salt and water can be co-produced stably by suppressing a scale trouble of the RO membrane 25a in the reverse osmosis membrane apparatus 25 as well as discharging no concentrated water with a higher concentration than that of seawater so as not to give adverse effects on the environment.

Second Embodiment

Figure 2:
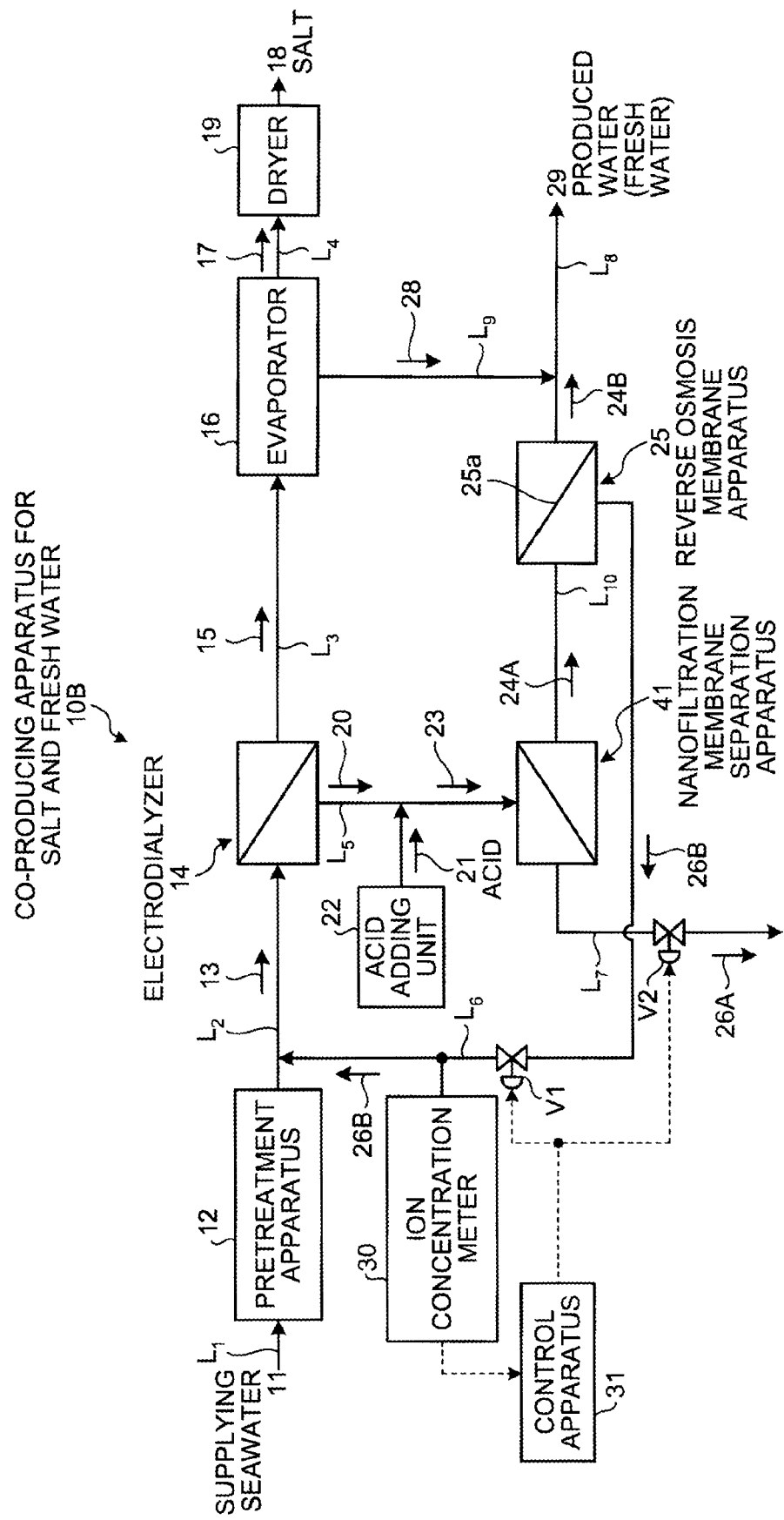
FIG. 2 is a schematic of a co-producing apparatus for salt and fresh water according to a second embodiment.

A co-producing apparatus for salt and fresh water according to a second embodiment of the present invention will be explained with reference to the accompanying drawings. FIG. 2 is a schematic of the co-producing apparatus for salt and fresh water according to the present embodiment.

As shown in FIG. 2, a co-producing apparatus for salt and fresh water 10B includes, in addition to the co-producing apparatus for salt and fresh water 10A represented in FIG. 1, a nanofiltration membrane separation apparatus 41 that removes divalent ions from the acid-added diluted brine 23 that is the diluted brine 20 to which the acid 21 is added by the electrodialyzer 14. The reverse osmosis membrane apparatus 25 having the RO membrane 25a that produces fresh water that is second permeated water 24B obtained by removing a salt content of first permeated water 24A supplied from the nanofiltration membrane separation apparatus 41 is provided at the rear stage of the nanofiltration membrane separation apparatus 41. In FIG. 2, $L_{10}$ denotes a line that supplies the first permeated water 24A from the nanofiltration membrane separation apparatus 41.

The total amount of salt-enriched second membrane separation concentrated water 26B supplied from the reverse osmosis membrane apparatus 25 is brought back to the line $L_2$ positioned at the rear flow side of the pretreatment apparatus 12 through the recycle line $L_6$. The total amount of first membrane separation concentrated water 26A supplied from the nanofiltration membrane separation apparatus 41 is discharged into a sea area through the water discharge line $L_7$.

According to the present embodiment, divalent ion concentrated water is discharged into a sea area, as the first membrane separation concentrated water 26A, by passing all of the diluted brine 20 supplied from the electrodialyzer 14 through the nanofiltration membrane separation apparatus 41 to eliminate divalent ions. Meanwhile, treated water that is the first permeated water 24A is supplied to the reverse osmosis apparatus 25. The supplying amount of seawater can be reduced by recycling the total amount of the second membrane separation concentrated water 26B to the electrodialyzer 14 side.

The recovery rate of the produced water 29 and the produced amount of chlorine (the salt 18) can be increased, because the reverse osmosis membrane apparatus 25 does not discharge water into a sea area.

By recycling the whole second membrane separation concentrated water 26B supplied from the reverse osmosis membrane apparatus 25, the concentrations of $Ca^{2+}$ and $SO_4^{2-}$ ions are accumulated in the system, which may generate gypsum scale. However, the nanofiltration membrane separation apparatus 41 removes divalent ions of $Ca^{2+}$ and $SO_4^{2-}$ ions to discharge the ions out of the system. As a result, the concentrations in the system can be equal to or less than their saturation concentrations, which can overcome the disadvantage.

As described above, the co-producing method of salt and fresh water according to the present invention includes: filtering a turbid content of the supplying seawater 11 that is raw water by the pretreatment apparatus 12; electrodialyzing the pretreated water 13 by the electrodialyzer 14; producing the salt 18 by evaporating the resultant concentrated brine 15 as well as adding the acid 21 to the diluted brine 20 obtained after the electrodialyzing; and obtaining the fresh water that is the permeated water obtained by removing a salt content from the acid-added diluted brine 23 by the reverse osmosis membrane apparatus 25. In the co-producing method, the pH of the acid-added diluted brine 23 is set to be equal to or less than 7.3 to prevent scale generation. The divalent ions in the acid-added diluted brine 23 are removed by using the nanofiltration membrane separation apparatus 41 at the front stage of the reverse osmosis membrane apparatus 25. The total amount of the salt-enriched second membrane separation concentrated water 26B supplied from the reverse osmosis membrane apparatus 25 is brought back to the rear flow side of the pretreatment apparatus 12. The total amount of the first membrane separation concentrated water 26A supplied from the nanofiltration membrane separation apparatus 41 is discharged into a sea area. The ratio between the discharging amount of the first membrane separation concentrated water to be discharged into a sea area and the supplying amount of the raw water is adjusted by detecting the ion concentrations of divalent ions and $SO_4^{2-}$ ions in the second membrane separation concentrated water 26B to be recycled so that these ion concentrations are equal to or less than the saturation concentration of gypsum. Therefore, salt and water can be co-produced stably by suppressing a scale trouble of the RO membrane 25a in the reverse osmosis membrane apparatus 25 as well as discharging no concentrated water with a higher concentration than that of seawater so as not to give adverse effects on the environment.

Figure 3:
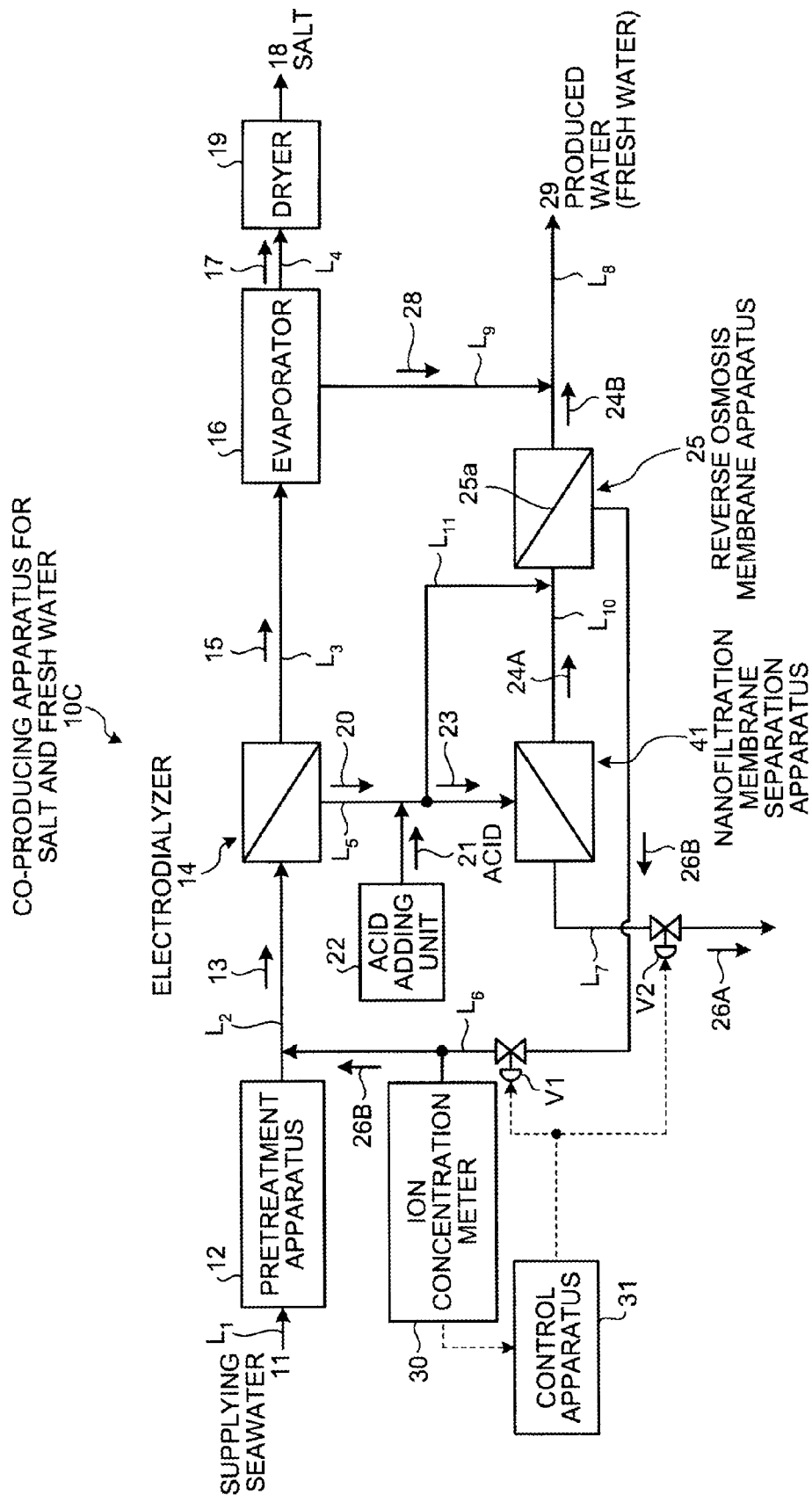
FIG. 3 is a schematic of another co-producing apparatus for salt and fresh water according to the second embodiment.

FIG. 3 is a modification of the present embodiment.

As shown in FIG. 3, a co-producing apparatus for salt and fresh water 10C includes, in addition to the co-producing apparatus for salt and fresh water 10B represented in FIG. 2, a bypass line $L_{11}$ that is branched off from the supplying line $L_5$, which supplies the diluted brine 20 supplied from the electrodialyzer 14, to the line $L_{10}$ while bypassing the nanofiltration membrane separation apparatus 41. Thus, the acid-added diluted brine 23 is supplied directly to the reverse osmosis membrane apparatus 25.

This is for recycling without sending the first membrane separation concentrated water 26A to be discharged into a sea area in an amount exceeding the treatment amount to the nanofiltration membrane separation apparatus 41.

A bypassing amount to be bypassed may be approximately two-thirds of the acid-added diluted brine 23.

Therefore, approximately one-third of the acid-added diluted brine 23 is supplied to the nanofiltration membrane separation apparatus 41.

As a result of this, the equipment of the nanofiltration membrane separation apparatus 41 can be downsized.

Test Embodiment

Tested results of: a first test embodiment in which the apparatus that co-produces salt and fresh water of the first embodiment is used; a second test embodiment in which the apparatus of the second embodiment is used; a first comparative embodiment in which no water is recycled; and a second comparative embodiment in which only salt is produced, are represented in Table 1, regarding the ratio of the produced amount of fresh water (relative to supplying seawater), the ratio of the discharged amount of water (relative to supplying seawater), and the recovery rate of chlorine (concentrated brine/supplying seawater).

TABLE 1

|  | First test embodiment | Second test embodiment | First comparative embodiment | Second comparative embodiment |
| --- | --- | --- | --- | --- |
| Recycling rate of concentrated water (%) | 68.2 | 78.6 | 0 | — |
| Ratio of produced amount of fresh water (relative to supplying seawater) | 55.1 | 63.4 | 27.0 | 0 |
| Ratio of discharged amount of water (relative to supplying seawater) | 31.8 | 21.4 | 64.0 | 93.5 |
| Recovery rate of Cl (concentrated brine)/(supplying seawater) | 72.9 | 85.8 | 37.0 | 37.0 |
| Produced products | Salt and fresh water | Salt and fresh water | Salt and fresh water | Salt only |

As represented above, both of the ratio of the produced amount of fresh water and the recovery rate of chlorine for the apparatus in the first test embodiment increased compared with those of the first comparative embodiment and the second comparative embodiment. The ratio of the discharged amount of water decreased.

In the second test embodiment, as compared with the first test embodiment that does not use the nanofiltration membrane separation apparatus 41, the ratio of the produced amount of fresh water (relative to supplying seawater) increased from 55.1% to 63.4%. Chlorine (proportional to the recovery rate of salt) increased from 72.9% to 85.8%.

INDUSTRIAL APPLICABILITY

As described above, with the co-producing apparatus for salt and fresh water according to the present invention, adverse effects to the biological environment due to a water mass with a high salt concentration and a high density at the sea bottom accumulated on the sea bottom near a shore can be prevented by discharging water with a concentration substantially equal to or less than a supplying seawater salt concentration.

EXPLANATIONS OF LETTERS OR NUMERALS 10A, 10B, 10C co-producing apparatus for salt and fresh water
11 supplying seawater
12 pretreatment apparatus
13 pretreated water
14 electrodialyzer
15 concentrated brine (concentrated salt water)
16 evaporator
17 condensed water
18 salt
19 dryer
20 diluted brine
21 acid
22 acid adding unit
23 acid-added diluted brine
24 permeated water
25a reverse osmosis membrane (RO membrane)

25 reverse osmosis membrane apparatus
26, 26-1, 26-2 membrane separation concentrated water
26A first membrane separation concentrated water
26B second membrane separation concentrated water
28 evaporated water
29 produced water (fresh water)

The invention claimed is:

1. A co-producing apparatus for salt and fresh water comprising:
   a raw water supply line that supplies raw water;
   a pretreatment apparatus that filters a turbid content of the raw water so as to produce pretreated water;
   an electrodialyzer that electrodialyzes the pretreated water so as to produce concentrated brine and diluted brine;
   an evaporator that evaporates the concentrated brine so as to produce condensed water and evaporated water;
   a dryer that produces salt by drying the condensed water;
   an acid adding unit that adds acid to the diluted brine;
   a reverse osmosis membrane apparatus having a reverse osmosis membrane that produces (i) fresh water that is permeated water obtained by removing a salt content from the diluted brine to which the acid is added and (ii) salt-enriched membrane separation concentrated water;
   a recycle line that brings a part of the salt-enriched membrane separation concentrated water back to a rear flow side of the pretreatment apparatus as a recycling membrane separation concentrated water;
   a water discharge line that discharges a rest part of the salt-enriched membrane separation concentrated water into a sea area as a discharging membrane separation concentrated water;
   an ion concentration meter that detects ion concentrations of divalent ions and $SO_4^{2-}$ ions of the recycling membrane separation concentration water, the ion concentration meter being provided on the recycle line;
   a control apparatus that controls to adjust a ratio between a discharging amount of the discharging membrane separation concentrated water to be discharged into a sea area and a supplying amount of the raw water of the raw water supply line in response to the detected ion concentrations so that these ion concentrations are equal to or less than a saturation concentration of gypsum, wherein
   produced water is obtained by combining the evaporated water supplied from the evaporator with the permeated water supplied from the reverse osmosis membrane apparatus.

2. A co-producing apparatus for salt and fresh water comprising:
   a raw water supply line that supplies raw water;
   a pretreatment apparatus that filters a turbid content of the raw water so as to produce pretreated water;
   an electrodialyzer that electrodialyzes the pretreated water so as to produce concentrated brine and diluted brine;
   an evaporator that evaporates the concentrated brine so as to produce condensed water and evaporated water;
   a dryer that produces salt by drying the condensed water;
   an acid adding unit that adds acid to the diluted brine;
   a nanofiltration membrane separation apparatus that removes divalent ions from the diluted brine to which the acid is added so as to produce treated water and membrane separation concentrated water;
   a reverse osmosis membrane apparatus having a reverse osmosis membrane that produces (i) fresh water that is permeated water obtained by removing a salt content of the treated water supplied from the nanofiltration membrane separation apparatus and (ii) salt-enriched membrane separation concentrated water;
   a recycle line that brings a total amount of the salt-enriched membrane separation concentrated water supplied from the reverse osmosis membrane apparatus back to a rear flow side of the pretreatment apparatus as recycling membrane separation concentrated water;
   a water discharge line that discharges a total amount of the membrane separation concentrated water supplied from the nanofiltration membrane separation apparatus into a sea area;
   an ion concentration meter that detects ion concentrations of divalent ions and $SO_4^{2-}$ ions of the recycling membrane separation concentrated water;
   a control apparatus that controls to adjust a ratio between a discharging amount of the membrane separation concentrated water to be discharged into a sea area and a supplying amount of the raw water of the raw water supply line in response to the detected ion concentrations so that these ion concentrations are equal to or less than a saturation concentration of gypsum, wherein
   produced water is obtained by combining the evaporated water supplied from the evaporator with the permeated water supplied from the reverse osmosis membrane apparatus.

3. The co-producing apparatus for salt and fresh water according to claim 2, further comprising a bypass line through which, after the acid is added to the diluted brine supplied from the electrodialyzer, a part of the acid-added diluted brine bypasses the nanofiltration membrane separation apparatus, to be supplied to the reverse osmosis membrane apparatus.

4. A co-producing method for salt and fresh water comprising:
   supplying raw water;
   filtering a turbid content of the raw water, so as to obtain pretreated water;
   electrodialyzing the pretreated water so as to obtain diluted brine and concentrated brie;
   evaporating the concentrated brine to produce salt;
   adding acid to the diluted brine;
   removing a salt content from acid-added diluted brine to obtain (i) fresh water that is permeated water and (ii) salt-enriched membrane separation concentrated water;
   bringing a part of the salt-enriched membrane separation concentrated water as recycling membrane separation concentrated water to the pretreated water;
   discharging a rest part of the salt-enriched membrane separation concentrated water into a sea area as a discharging membrane separation concentrated water;
   detecting ion concentration of divalent ions and $SO_4^{2-}$ ions of the recycling membrane separation concentrated water; and
   adjusting a ratio between a discharging amount of the discharging membrane separation concentrated water to be discharged into a sea area and a supplying amount of the raw water in response to the detected ion concentrations so that these ion concentrations are equal to or less than a saturation concentration of gypsum, wherein
   produced water is obtained by combining the evaporated water with the permeated water.

5. A co-producing method for salt and fresh water comprising:
   supplying raw water;
   filtering a turbid content of the raw water so as to obtain pretreated water;
   electrodialyzing the pretreated water so as to obtain concentrated brine and diluted brine;

evaporating the concentrated brine so as to obtain condensed water and evaporated water;
drying the condensed water so as to obtain salt;
adding acid to the diluted brine;
removing divalent ions from the diluted brine to which the acid is added so as to obtain treated water and membrane separation concentrated water;
producing (i) fresh water that is permeated water obtained by removing a salt content of the treated water and (ii) salt-enriched membrane separation concentrated water;
brings a total amount of the salt-enriched membrane separation concentrated water to the pretreated water as recycling membrane separation concentrated water;
discharging a total amount of the membrane separation concentrated water into a sea area;
detecting ion concentrations of divalent ions and $SO_4^{2-}$ ions of the recycling membrane separation concentrated water;
adjusting a ratio between a discharging amount of the membrane separation concentrated water to be discharged into a sea area and a supplying amount of the raw water in response to the detected ion concentrations so that these ion concentrations are equal to or less than a saturation concentration of gypsum, wherein
produced water is obtained by combining the evaporated water supplied from the evaporator with the permeated water supplied from the reverse osmosis membrane apparatus.

* * * * *